United States Patent
Wu et al.

(10) Patent No.: US 10,804,732 B2
(45) Date of Patent: Oct. 13, 2020

(54) POWER SUPPLY DEVICE USING ELECTROMAGNETIC POWER GENERATION

(71) Applicants: Kun-Lung Wu, Kaohsiung (TW); Hai-Ruo Wu, Kaohsiung (TW); Chu-Xi Wu, Kaohsiung (TW)

(72) Inventors: Kun-Lung Wu, Kaohsiung (TW); Hai-Ruo Wu, Kaohsiung (TW); Chu-Xi Wu, Kaohsiung (TW)

(73) Assignees: Black Energy Co., Ltd, Kaohsiung (TW); Kun-Lung Wu, Kaohsiung (TW); Hai-Ruo Wu, Kaohsiung (TW); Chu-Xi Wu, Kaohsiung (TW)

( * ) Notice: Subject to any disclaimer, the term of this patent is extended or adjusted under 35 U.S.C. 154(b) by 116 days.

(21) Appl. No.: 16/249,868

(22) Filed: Jan. 16, 2019

(65) Prior Publication Data
US 2019/0148974 A1  May 16, 2019

(51) Int. Cl.
*H02J 7/14* (2006.01)
*H01M 10/46* (2006.01)
*H01M 4/56* (2006.01)
*H01M 4/38* (2006.01)
*H01M 4/36* (2006.01)
*H01M 4/583* (2010.01)
*H01M 10/06* (2006.01)
*H01G 2/02* (2006.01)
*H02J 7/34* (2006.01)

(52) U.S. Cl.
CPC ............... *H02J 7/14* (2013.01); *H01G 2/02* (2013.01); *H01M 4/364* (2013.01); *H01M 4/38* (2013.01); *H01M 4/56* (2013.01); *H01M 4/583* (2013.01); *H01M 10/06* (2013.01); *H01M 10/46* (2013.01); *H02J 7/345* (2013.01); *Y02T 10/7072* (2013.01); *Y02T 90/14* (2013.01)

(58) Field of Classification Search
CPC ............ H02J 7/14; H02J 7/345; H01M 10/06; H01M 10/46; H01M 4/56; H01M 4/38; H01M 4/364; H01M 4/583; H01G 2/02; H01G 4/32; H01G 4/40; Y02T 10/7005; Y02T 90/14; Y02T 10/7072
See application file for complete search history.

(56) References Cited

U.S. PATENT DOCUMENTS

| | | | | |
|---|---|---|---|---|
| 8,353,389 | B2* | 1/2013 | Gray | B62B 5/0423 188/1.12 |
| 10,020,721 | B2* | 7/2018 | Davis | H02J 9/08 |
| 10,063,180 | B2* | 8/2018 | Wang | H02J 7/14 |
| 10,093,196 | B2* | 10/2018 | Unno | B60L 53/63 |
| 10,119,513 | B2* | 11/2018 | Tahara | B60R 16/023 |

(Continued)

*Primary Examiner* — Michael C Zarroli (57) ABSTRACT

A power supply device using electromagnetic power generation includes an electric motor, an electromagnet, a winding, a rechargeable unit, and a battery case. The electromagnet is operatively connected to the electric motor so that an activation of the electric motor changes a magnetic field of the electromagnet. The winding is around the electromagnet so that the change of the magnetic field of the electromagnet generates emf in the winding. The rechargeable unit is electrically connected to both the electric motor and the electromagnet so that the emf is stored in the rechargeable unit or supply to an external electric load. The battery case includes an electrical wire electrically connected to the winding.

2 Claims, 8 Drawing Sheets

(56) References Cited

U.S. PATENT DOCUMENTS

| | | | |
|---|---|---|---|
| 2006/0134515 A1* | 6/2006 | Kumashiro | H01M 4/133 |
| | | | 429/209 |
| 2012/0262018 A1* | 10/2012 | Thiara | H02K 53/00 |
| | | | 310/113 |
| 2015/0042284 A1* | 2/2015 | Murata | H01M 10/44 |
| | | | 320/126 |
| 2017/0226934 A1* | 8/2017 | Robic | F02C 7/32 |
| 2018/0019646 A1* | 1/2018 | Quick | H02K 3/26 |
| 2018/0316054 A1* | 11/2018 | Matsushita | H01M 10/0587 |
| 2019/0036114 A1* | 1/2019 | Matsumoto | H01M 4/38 |
| 2019/0341605 A1* | 11/2019 | Tanaka | H01M 4/364 |

\* cited by examiner

POWER SUPPLY DEVICE USING ELECTROMAGNETIC POWER GENERATION

BACKGROUND OF THE INVENTION

1. Field of the Invention

The invention relates to power supplies and more particularly to a power supply device using electromagnetic power generation for continuously supplying power and continuously charging.

2. Description of Related Art

Batteries or cells are well known for supplying power to, for example, flashlights, electric vehicles, etc. A conventional battery (e.g., lithium-ion battery) includes an anode, a cathode, a separator and a battery case in which the separator enables electric current to flow in the form of ions for power supply.

Another type of battery is solid state battery which uses a fast ion conductor so that more ions may flow to one end to increase electric current and thus capacity of the battery. Therefore, the solid state batteries are advantageous.

The fast ion conductor has characteristics of being inflammable, non-corrosive, non-volatile and no leakage. It is thus not required to provide a safety device capable of withstanding high heat, collision and piercing to a solid state battery. Further, the solid state batteries are compact.

However, most cells including dry cells, wet cells and solid state batteries are primary, i.e., disposed after being consumed. However, disposed cells are not environmentally friendly.

Thus, the need for improvement still exists.

SUMMARY OF THE INVENTION

It is therefore one object of the invention to provide a power supply device using electromagnetic power generation for overcoming drawbacks associated with the conventional art.

For achieving above and other objects, the invention provides a power supply device using electromagnetic power generation, comprising an electric motor, an electromagnet, a winding, a rechargeable unit, and a battery case wherein the electric motor is disposed in the power supply device to serve as a power source; the electromagnet is operatively connected to the electric motor so that an activation of the electric motor is configured to change a magnetic field of the electromagnet; the winding is disposed around the electromagnet so that the change of the magnetic field of the electromagnet generates electromotive force (emf) in the winding; the rechargeable unit is electrically connected to both the electric motor and the electromagnet so that the emf generated in the winding is configured to store in the rechargeable unit or supply to an external electric load; and the battery case is a shell of the power supply device and includes an electrical wire electrically connected to the winding, and the battery case is electrically isolated.

Preferably, voltage of the rechargeable unit may be equal to emf of the winding or not. Thus, voltage of the rechargeable unit and/or the emf of the winding may be supplied to the external electric load depending on applications, i.e., being a two-voltage output.

Preferably, the battery case is the shell of the power supply device. An electrical wire is electrically interconnected the winding and another external electric load through the battery case. The battery case is electrically isolated in nature.

Preferably, the battery case is shaped as a pole, cylinder, tetrahedron, cube, hexagon, octagon, or pyramid depending on applications.

Preferably, the rechargeable unit is shaped as a pole, cylinder, tetrahedron, cube, hexagon, octagon, or pyramid depending on applications.

Preferably, the rechargeable unit is implemented as a capacitor (e.g., a hollow capacitor) for storing electrical energy generated by the winding in an electric field.

Preferably, the battery is a cell (e.g., a hollow cell). Specifically, the cell is a solid state battery which is formed of composite materials having sintered carbon. The sintered carbon has excellent heat dissipation property so that the solid state battery has excellent heat dissipation property.

Preferably, the solid state battery includes an anode, a separation layer having one side connected to the anode, and a cathode connected to the other side of the separation layer. The solid state battery can store electrical energy generated by the winding prior to supplying same to the electric motor for rotation. The rotating electric motor may change the magnetic field of the electromagnet by rotating the electromagnet. Thus, it is possible of continuously supplying power by continuously charging. As a result, a voltage is generated in the winding. Therefore, the external electric load can be activated by the power supplied from the winding.

Preferably, a separator is provided between the rechargeable unit and the winding so as to prevent short circuit from occurring in the winding. Emf generated by the winding may be supplied to the rechargeable unit by electrical wires.

Preferably, the rechargeable unit includes one or more wet cells (e.g., lead-carbon batteries) connected in series for supplying one of a plurality of different voltages to an external electric load or storing electrical energy. The lead-carbon batteries may supply power to an external electric load when it is fully charged.

Preferably, output voltage of the rechargeable unit may be equal to emf of the winding or not. Thus, the invention not only supplies emf of the winding as output voltage but also supplies voltage of the rechargeable unit as output voltage. It is envisaged by the invention that two different voltages can be supplied to the external electric load depending on applications, i.e., being a two-voltage output.

Preferably, the lead-carbon battery includes an anode, a separation layer having one side connected to the anode, and a cathode connected to the other side of the separation layer. The anode is formed of lead dioxide, and the cathode is formed of composite materials having lead and carbon. The cathode includes a lead member connected to the separation layer, and a carbon member connected to the lead member. The cathode of the lead-carbon battery is made of a composite material of lead and carbon. It can increase charging and discharging operations. And in turn, it can decrease crystal from forming on the lead-carbon battery in the charging or discharging process. As an end, both charging efficiency and discharged power are increased greatly.

Preferably, initially, the rechargeable unit is fully charged to be capable of activating the electric motor for rotation. The rotation of the motor shaft of the electric motor changes the magnetic field of the electromagnet. And in turn, an emf is generated in the winding and supplied to the external electric load for consumption.

The emf may be supplied to the electric motor for continuing the rotational operation thereof. After a period of time, the rechargeable unit continuously supplies power to the electric motor for continuing its rotation. Also, the electromagnet continuously rotates to generate emf in the winding. As a result, it is possible of continuously supplying power to the external electric load by using electromagnetic power generation.

The above and other objects, features and advantages of the invention will become apparent from the following detailed description taken with the accompanying drawings.

DETAILED DESCRIPTION OF THE INVENTION

Referring to FIGS. 1 to 8, a power supply device 1 using electromagnetic power generation in accordance with the invention comprises an electric motor 11, an electromagnet 12, a winding 13, a rechargeable unit 14 and a battery case 15 as discussed in detail below.

Figure 1:
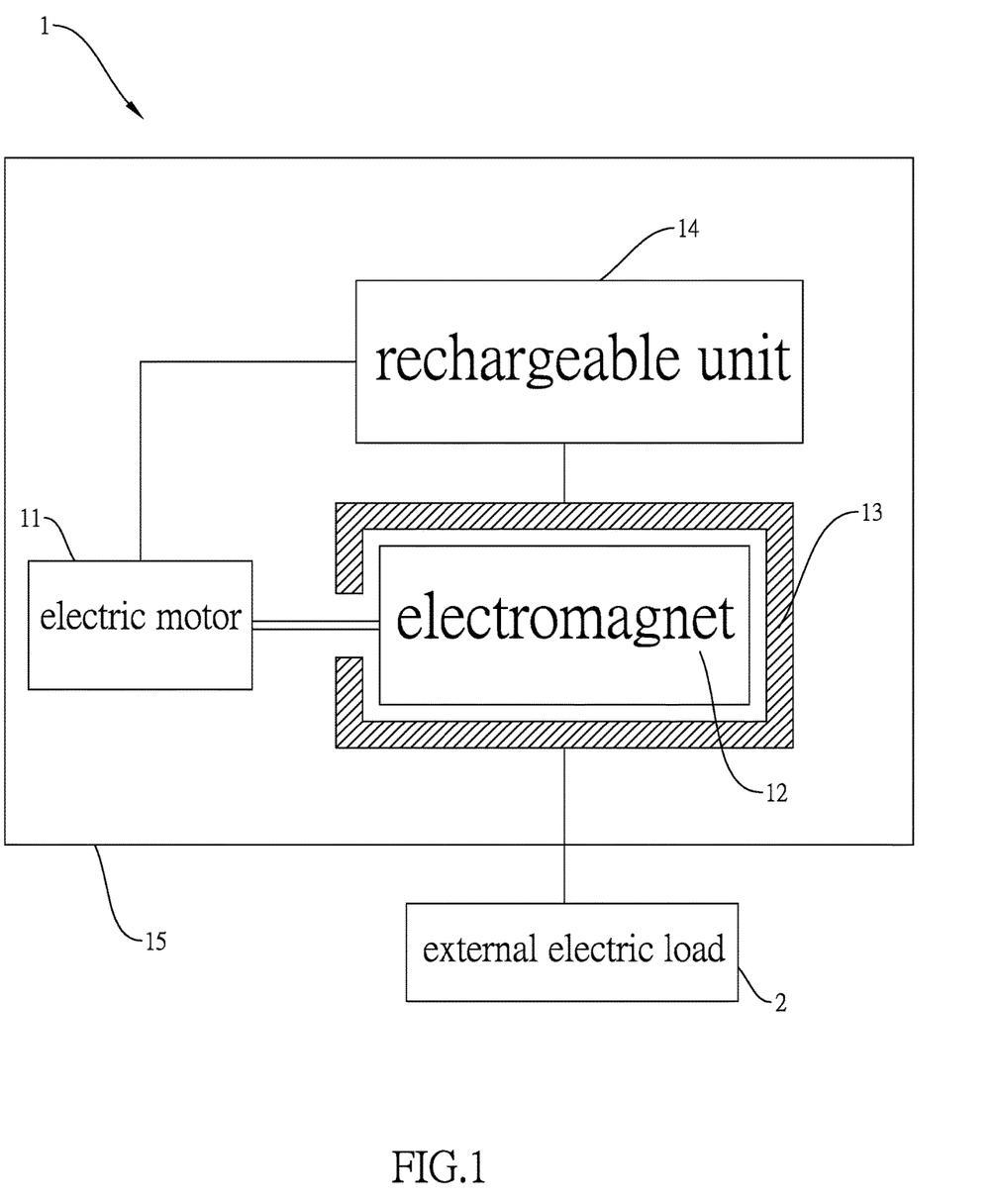
FIG. 1 schematically depicts a power supply device using electromagnetic power generation according to the invention.

The electric motor 11 is provided in the power supply device 1 to serve as a power source.

The electromagnet 12 is operatively connected to the electric motor 11 so that a rotation of the motor shaft of the electric motor 11 may change the magnetic field of the electromagnet 12.

The winding 13 is disposed around the electromagnet 12. The change of the magnetic field of the electromagnet 12 generates electromotive force (emf) in the winding 13. The number of turns in the winding 13 can be changed based on a desired voltage and a rotational speed of the electric motor 11. Therefore, supplied power can be changed based on an external electric load 2.

The fully charged rechargeable unit 14 may supply power to the external electric load 2. Voltage of the rechargeable unit 14 may be equal to emf of the winding 13 or not. Thus, voltage of the rechargeable unit 14 and/or the emf of the winding 13 may be supplied to the external electric load 2 depending on applications. Thus, the invention not only supplies emf of the winding as output voltage but also supplies voltage of the rechargeable unit as output voltage.

It is envisaged by the invention that two different voltages can be supplied to the external electric load depending on applications, i.e., being a two-voltage output.

The battery case 15 is the shell of the power supply device 1. An electrical wire 151 is electrically interconnected the winding 13 and another external electric load (see FIG. 4) through the battery case 15. The battery case 15 is electrically isolated in nature.

The rechargeable unit 14 is implemented as a capacitor for storing electrical energy generated by the winding 13 in an electric field.

Figure 2:
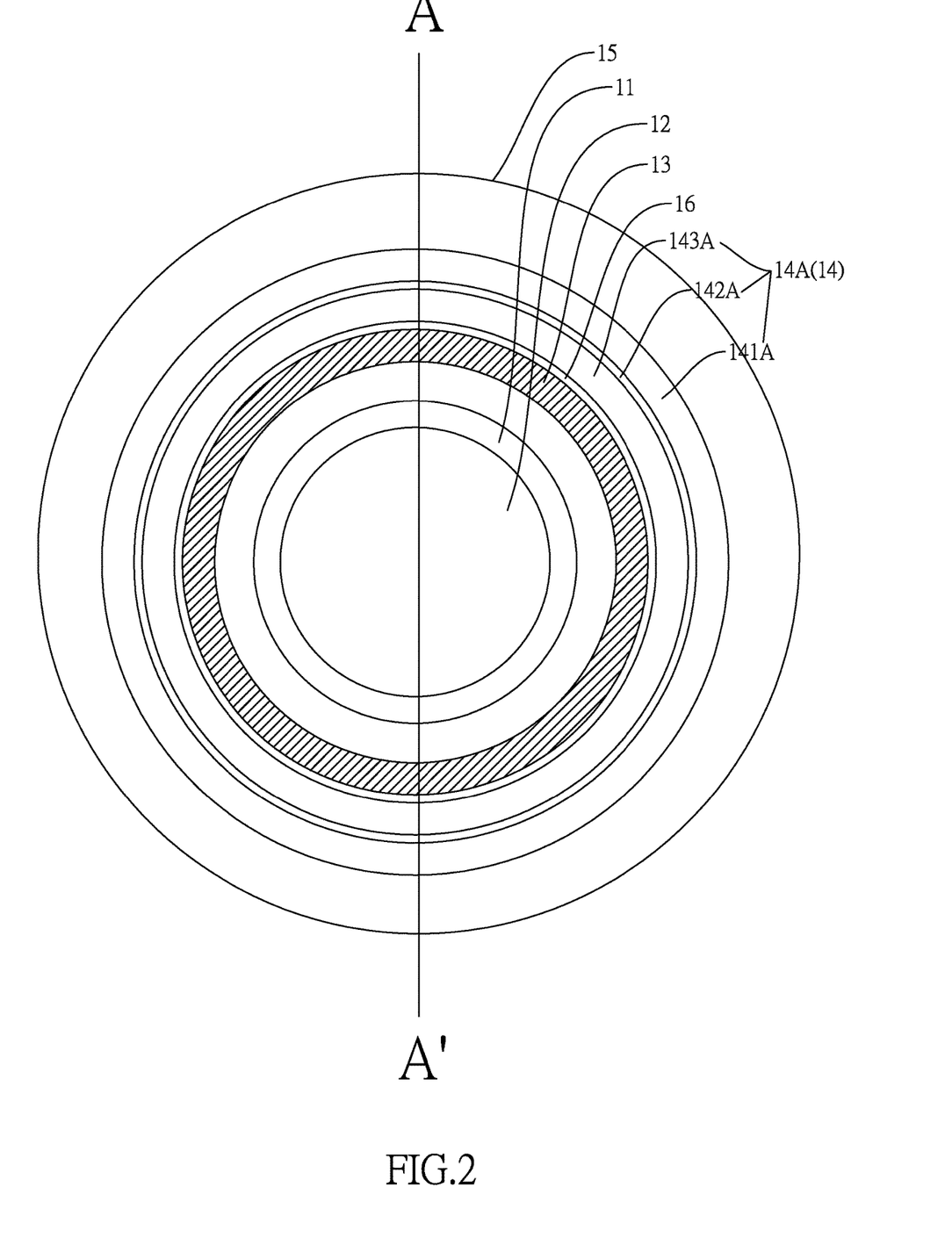
FIG. 2 is a top view of the power supply device.
Figure 3:
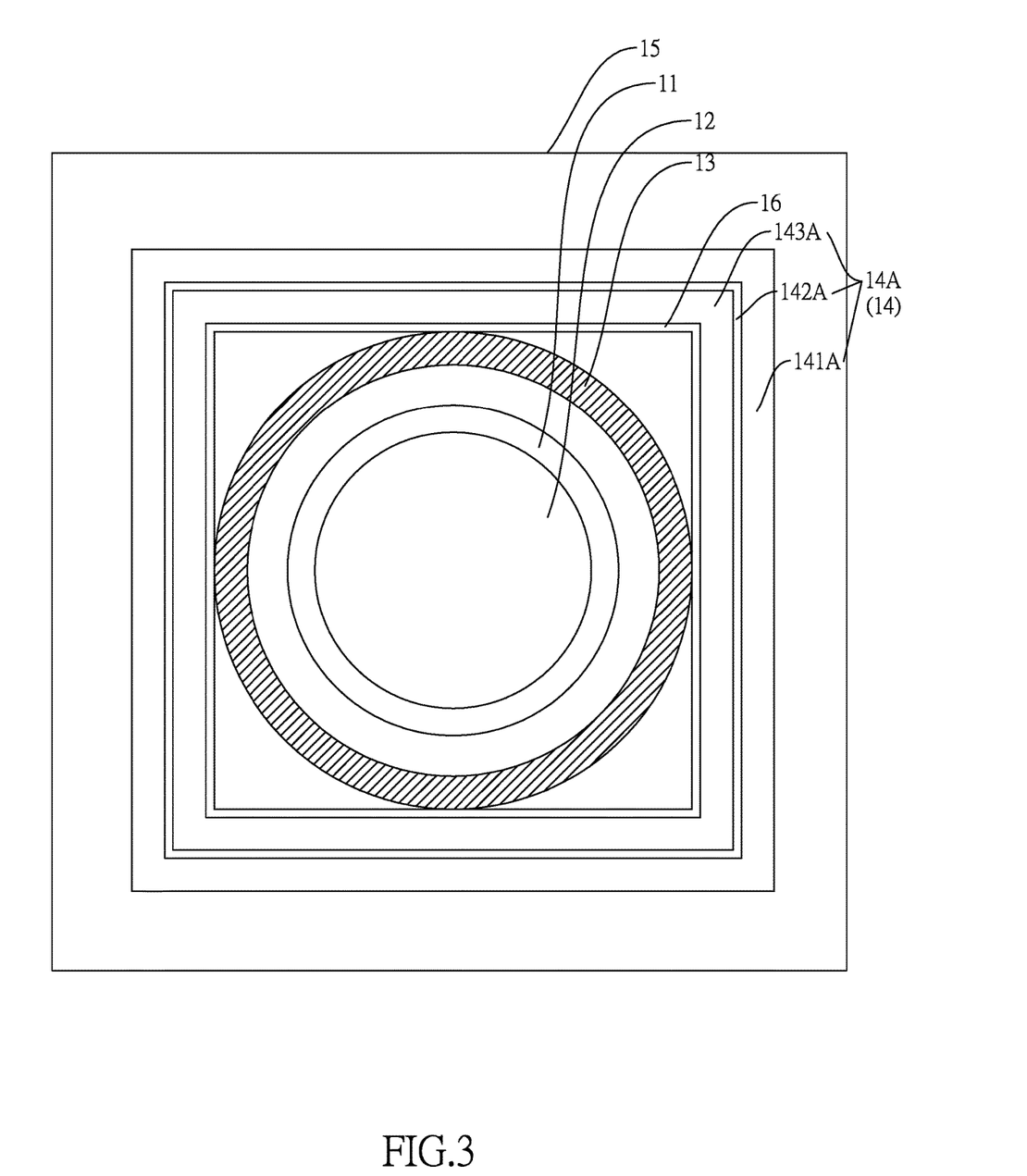
FIG. 3 is another top view of the power supply device.

The battery case 15 is shaped as a pole, cylinder, tetrahedron, cube, hexagon, octagon, or pyramid depending on applications. Similarly, the rechargeable unit 14 is shaped as a pole, cylinder, tetrahedron, cube, hexagon, octagon, or pyramid depending on applications. As shown in FIG. 2, both the battery case 15 and the rechargeable unit 14 are cylindrical. Alternatively, as shown in FIG. 3, both the battery case 15 and the rechargeable unit 14 are tetrahedrons.

Figure 4:
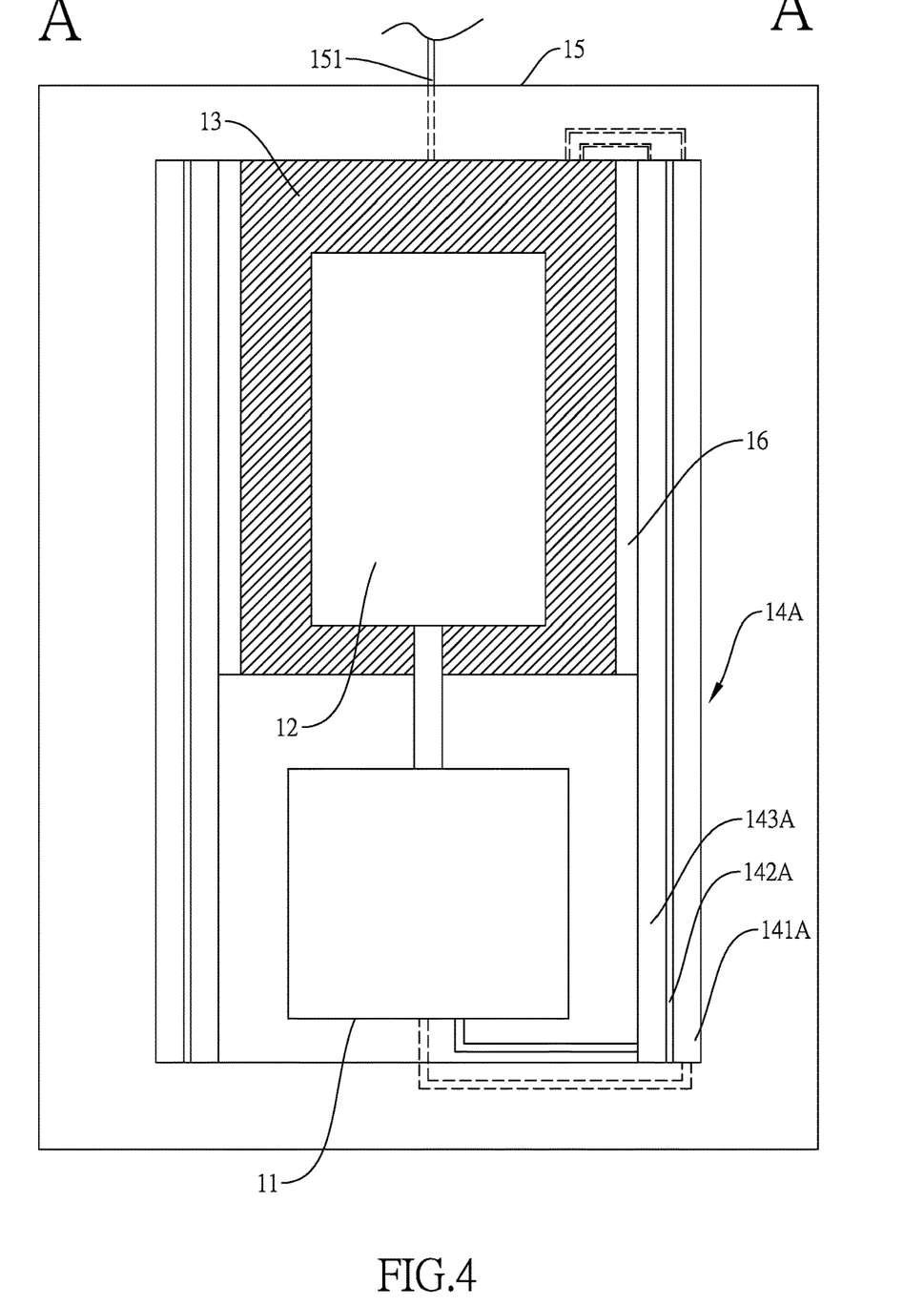
FIG. 4 is a sectional view taken along line A-A' of FIG. 2.

The rechargeable unit 14 is a rechargeable cell having a hollow. As shown in FIG. 4, the rechargeable unit 14 is a rechargeable solid state battery 14A formed of composite material including a substantial portion of sintered carbon having excellent heat dissipation property.

The rechargeable solid state battery 14A includes an anode 141A, a separation layer 142A having one side connected to the anode 141A, and a cathode 143A connected to the other side of the separation layer 142A. The rechargeable solid state battery 14A can store electrical energy generated by the winding 13 prior to supplying same to the electric motor 11 for rotation. The rotating electric motor 11 may change the magnetic field of the electromagnet 12 by rotating the electromagnet 12. As a result, a voltage is generated in the winding 13. Therefore, the external electric load 2 can be activated by the power supplied from the winding 13.

A separator 16 is provided between the rechargeable unit 14 and the winding 13 so as to prevent short circuit from occurring in the winding 13. Emf generated by the winding 13 may be supplied to the rechargeable unit 14 by electrical wires.

Figure 5:
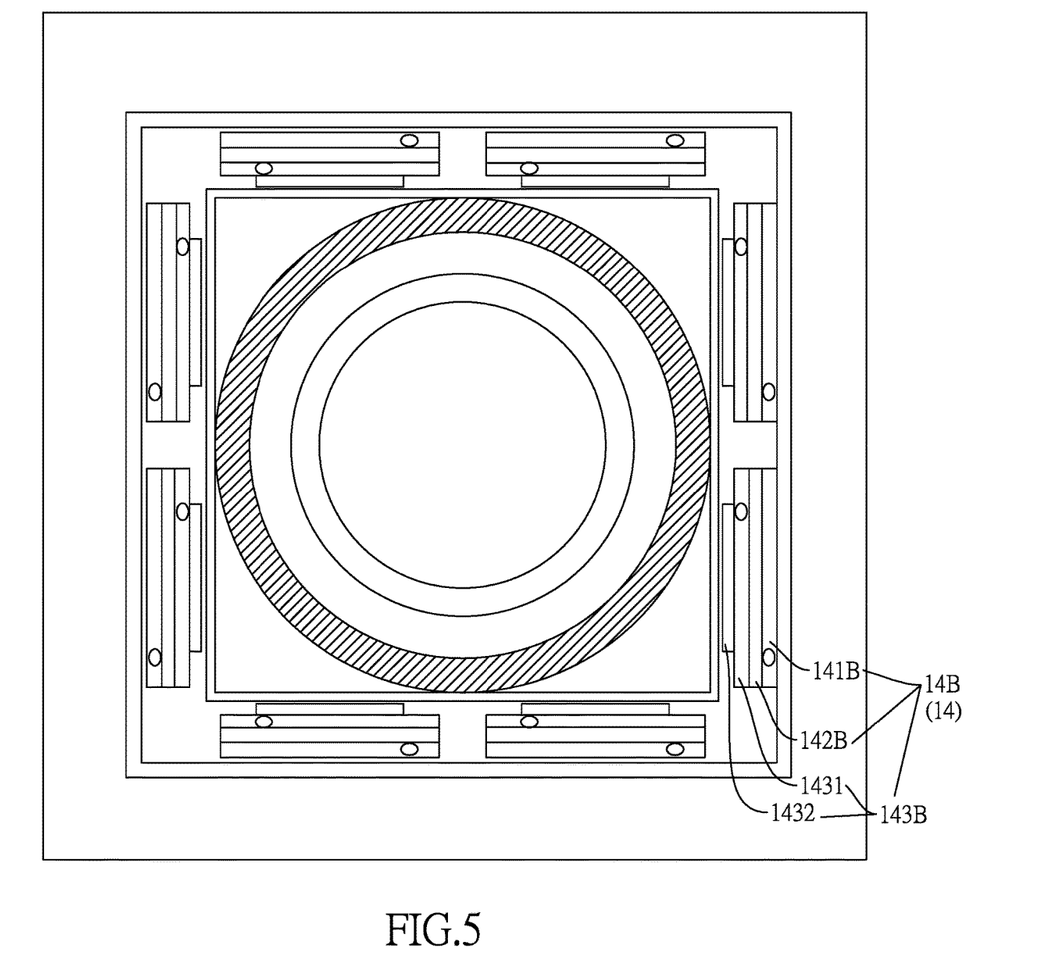
FIG. 5 is a top view of the lead-carbon battery as the rechargeable battery of the power supply device.
Figure 6:
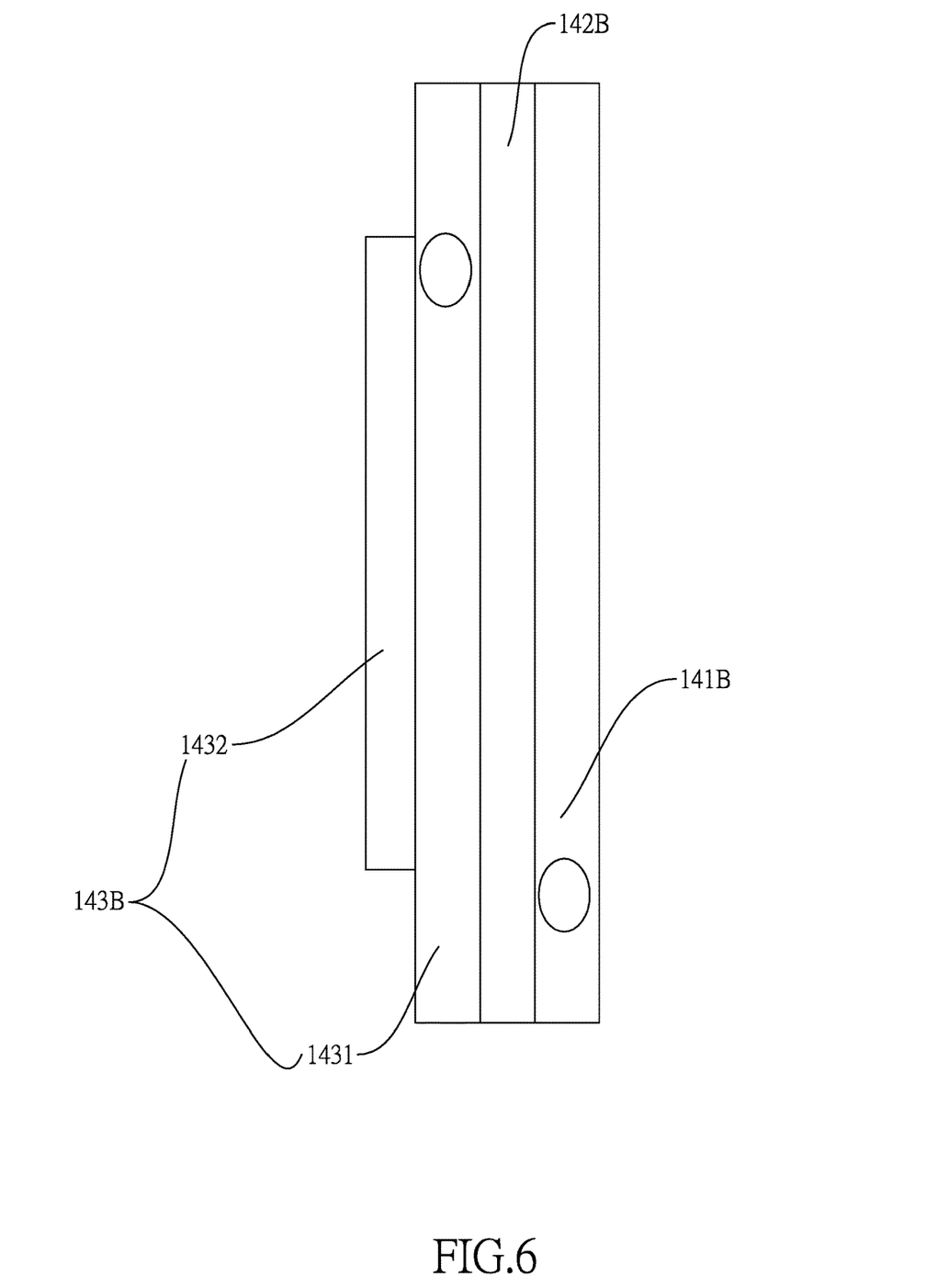
FIG. 6 is a top view of the lead-carbon battery of the power supply device.
Figure 7:
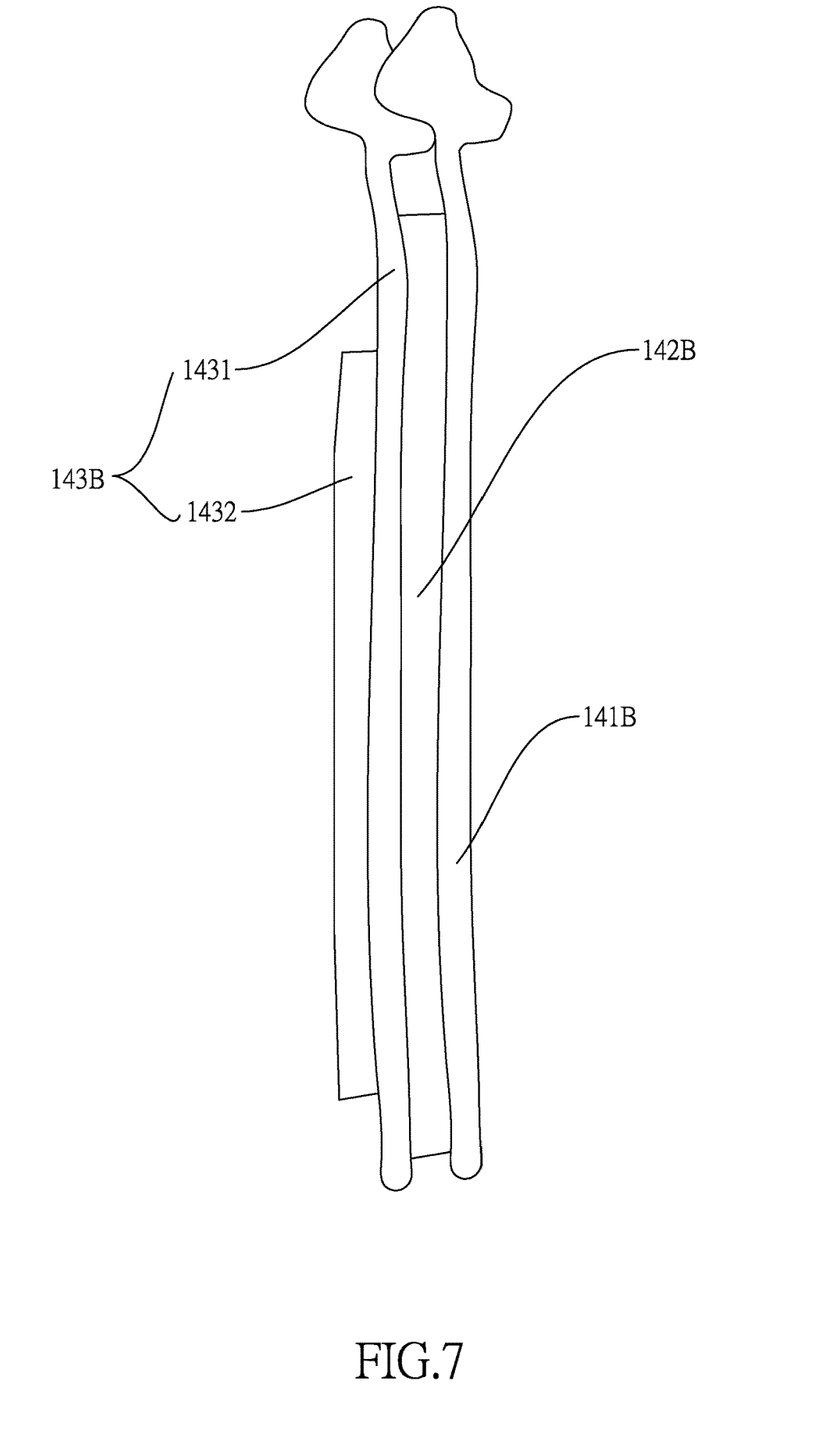
FIG. 7 is a side view of the lead-carbon battery of the power supply device.

As shown in FIGS. 5, 6 and 7 specifically, the rechargeable unit 14 includes one or more wet cells (e.g., lead-carbon batteries) 14B connected in series for supplying one of a plurality of different voltages to an external electric load or storing electrical energy. The lead-carbon batteries 14B may supply power to an external electric load when it is fully charged. Output voltage of the lead-carbon batteries 14B (i.e., rechargeable unit 14) may be equal to emf of the winding 13 or not. For example, emf of the winding 13 is 48V and output voltage of the lead-carbon batteries 14B is 16V. Thus, the invention not only supplies emf of the winding 13 as output voltage but also supplies voltage of the rechargeable unit 14 as output voltage. It is envisaged by the invention that two different voltages can be supplied to the external electric load 2 depending on applications, i.e., being a two-voltage output.

The lead-carbon battery 14B includes an anode 141B, a separation layer 142B having one side connected to the anode 141B, and a cathode 143B connected to the other side of the separation layer 142B. The anode 141B is formed of lead dioxide, and the cathode 143B is formed of composite materials such as lead and carbon. The cathode 143B includes a lead member 1431 connected to the separation layer 142B and a carbon member 1432 connected to the lead member 1431. The lead-carbon battery 14B is made by attaching the lead cathode of a conventional lead-acid battery to the carbon member 1432 (or carbon). In the embodiment, the lead-carbon battery 14B is made by attaching the lead cathode of a conventional lead-acid battery to the carbon member 1432. Thus, the cathode 143B is made of a composite material of lead and carbon having the lead member 1431 and the carbon member 1432. The charging and discharging properties of carbon can decrease crystal from forming on the conventional lead-acid battery in the charging or discharging process. It is understood that the crystallization can decrease charging and discharging efficiencies. It is envisaged by the invention that the rechargeable unit 14 implemented by the lead-carbon battery 14B and as a replacement of the conventional lead-acid battery can greatly increase charging and discharging efficiencies.

Figure 8:
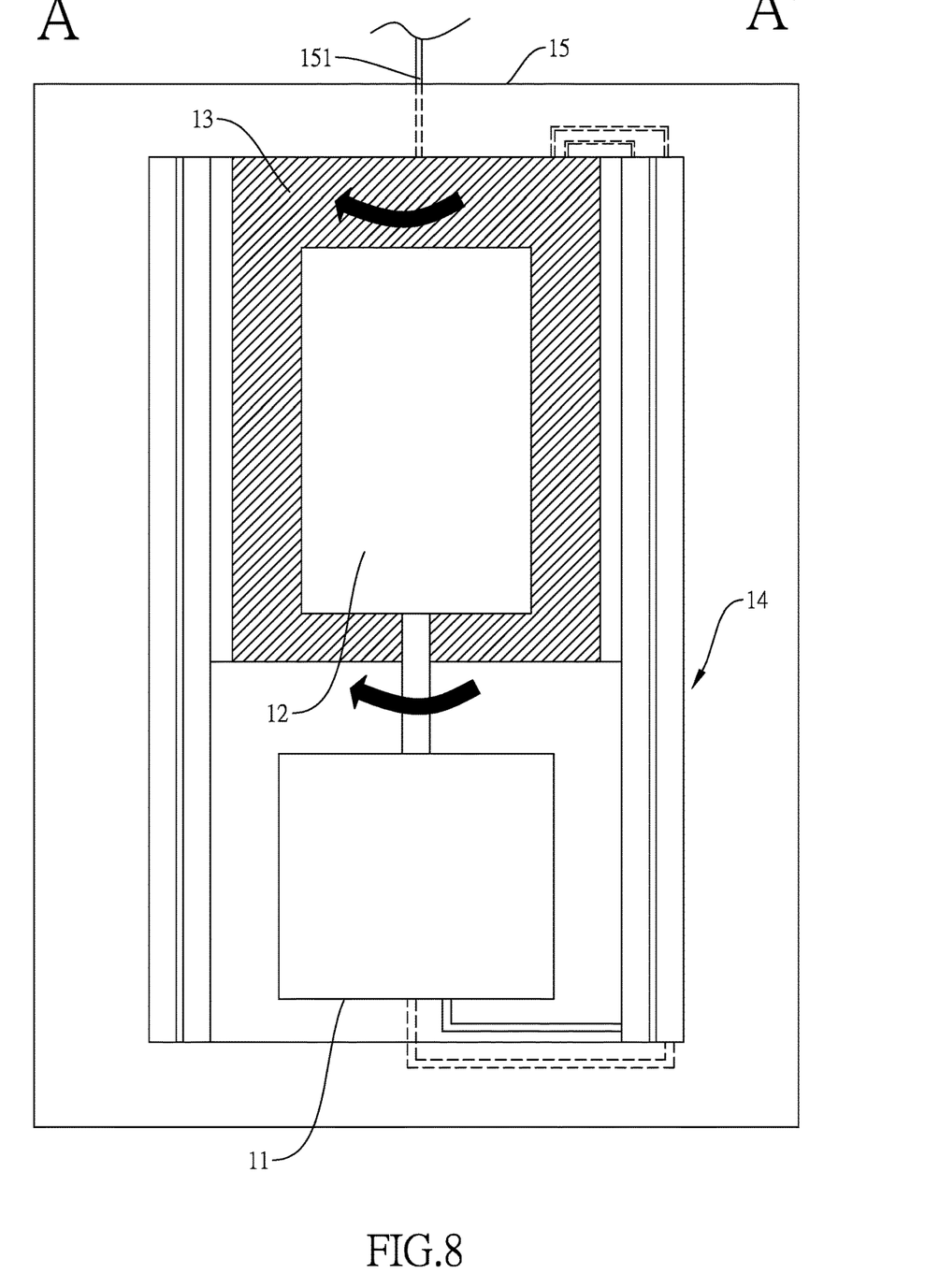
FIG. 8 schematically depicts operations of the power supply device.

As shown in FIG. 8 specifically, it schematically depicts operations of the power supply device 1. Initially, the rechargeable unit 14 is fully charged to be capable of activating the electric motor 11 for rotation. The rotation of the motor shaft of the electric motor 11 may change the magnetic field of the electromagnet 12. And in turn, an emf is generated in the winding 13 and supplied to the external electric load 2 for consumption. The emf may be supplied to the electric motor 11 for continuing the rotational operation thereof. After a period of time, the rechargeable unit 14 continuously supplies power to the electric motor 11 for continuing its rotation. Also, the electromagnet 12 continuously rotates to generate emf in the winding 13. As a result, it is possible of continuously supplying power to the external electric load 2 by using electromagnetic power generation.

The power supply device 1 using electromagnetic power generation of the invention has the following characteristics and advantages:

Continuous power supplying operation: a rotation of the electric motor causes the electromagnet to rotate. And in turn, an emf is generated in the winding. Power is supplied to the electric motor as a feedback. Thus, both the electric motor and the electromagnet continuously rotate. As an end, emf is continuously generated in the winding. This is the principle of continuously supplying power using electromagnetic power generation according to the invention.

Excellent heat dissipation: the rechargeable solid state battery formed of composite material including a substantial portion of sintered carbon having excellent heat dissipation property. Thus, heat is prevented from being accumulated in the power supply device due to power generation.

Increased charging efficiency and increased discharged power: the cathode of the lead-carbon battery is made of a composite material of lead and carbon. It can increase charging and discharging operations.

And in turn, it can decrease crystal from forming on the lead-carbon battery in the charging or discharging process. As an end, both charging efficiency and discharged power are increased greatly.

Customization: both the battery case and the rechargeable unit can have a size and a shape based on applications.

Multiple output voltage selection: the rechargeable unit may supply power to an external electric load when it is fully charged. One portion of output voltage of the rechargeable unit is supplied to the winding for generating emf and the other portion thereof is supplied to the external electric load, i.e., being a two-voltage output depending on applications.

While the invention has been described in terms of preferred embodiments, those skilled in the art will recognize that the invention can be practiced with modifications within the spirit and scope of the appended claims.

What is claimed is:

1. A power supply device using electromagnetic power generation, comprising an electric motor, an electromagnet, a winding, a rechargeable unit, a case around the electric motor, the electromagnet, the winding, and the rechargeable unit, and an electrical wire having an end electrically connected to the winding and passing through the case wherein:

the electric motor is disposed in the power supply device to serve as a power source;

the electromagnet is operatively connected to the electric motor so that an activation of the electric motor is configured to change a magnetic field of the electromagnet;

the winding is disposed around the electromagnet so that the change of the magnetic field of the electromagnet generates electromotive force (emf) in the winding;

the rechargeable unit is electrically connected to both the electric motor and the electromagnet so that the emf generated in the winding is configured to store in the rechargeable unit or supply to an external electric load;

the case is physically isolated;

the rechargeable unit is a wet cell;

the wet cell is a lead-carbon battery and includes an anode, a separation layer having one side connected to the anode, and a cathode connected to the other side of the separation layer;

the anode is formed of lead dioxide; and the cathode is formed of composite materials having lead and carbon.

2. The power supply device using electromagnetic power generation of claim 1, wherein the cathode includes a lead member connected to the separation layer, and a carbon member connected to the lead member.

\* \* \* \* \*